Figures 1, 2:
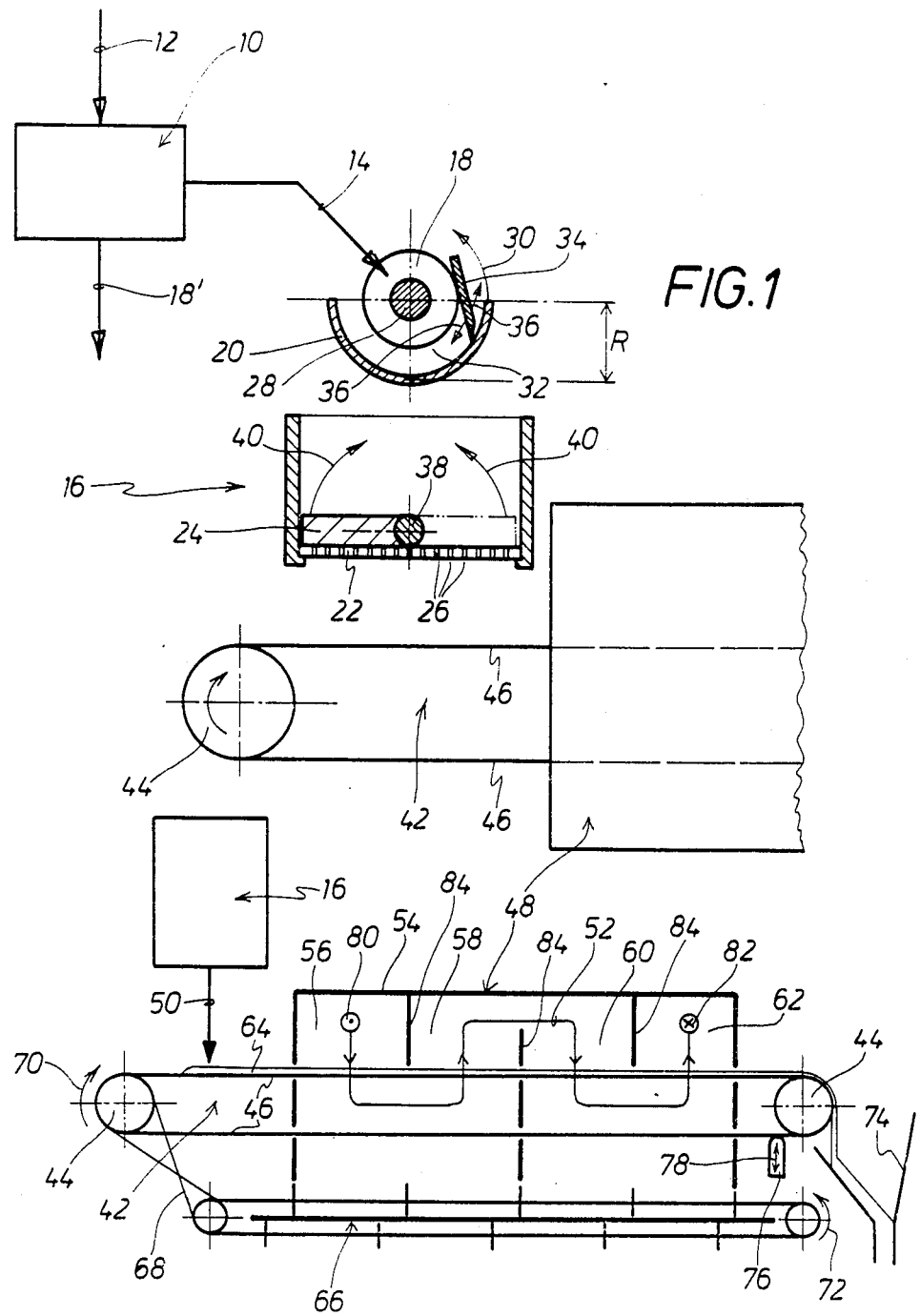

United States Patent [19]

Manzei

[11] Patent Number: 4,768,292
[45] Date of Patent: Sep. 6, 1988

[54] METHOD AND APPARATUS FOR DRYING SEWAGE SLUDGE

[75] Inventor: Jürgen Manzei, Marktredwitz, Fed. Rep. of Germany

[73] Assignee: Sevar Entsorgungsanlagen GmbH, Fed. Rep. of Germany

[21] Appl. No.: 2,662
[22] PCT Filed: May 14, 1986
[86] PCT No.: PCT/EP86/00282
§ 371 Date: Dec. 16, 1986
§ 102(e) Date: Dec. 16, 1986
[87] PCT Pub. No.: WO86/07049
PCT Pub. Date: Dec. 4, 1986

[30] Foreign Application Priority Data

May 22, 1985 [DE] Fed. Rep. of Germany ....... 3518323

[51] Int. Cl.$^4$ .............................................. F26B 19/00
[52] U.S. Cl. ........................................ 34/70; 100/904
[58] Field of Search ............... 34/9, 12, 14, 69, 70, 34/71; 100/904, 906

[56] References Cited

U.S. PATENT DOCUMENTS

| | | | |
|---|---|---|---|
| 3,156,198 | 11/1964 | Koch | 110/7 |
| 3,447,487 | 6/1969 | Landers et al. | 100/906 |
| 3,707,774 | 1/1973 | Eise et al. | 34/14 |
| 4,082,532 | 4/1978 | Imhof | 100/904 |
| 4,657,682 | 4/1987 | Uyama et al. | 34/14 |

FOREIGN PATENT DOCUMENTS 2015419 9/1979 United Kingdom .

OTHER PUBLICATIONS

German Journal "Ausbereitungstechnik", Sep. 1979, pp. 490–493.
"Lehr-Und Handbuch der Abwassertechnik", Band III 2. Auflage, 1978, Verlag Wilhelm Ernst & Sohn, Berlin, pp. 302–306.

Primary Examiner—Larry I. Schwartz
Attorney, Agent, or Firm—Lerner, David, Littenberg, Krumholz & Mentlik

[57] ABSTRACT

Described are a method of drying sewage sludge and an apparatus for carrying out the method, wherein the liquid sewage sludge is converted into a pastry consistency in a predrying means (10), the pastry sewage sludge is then put into the form of particles of relatively large surface area in a shaping means (16), and the particles are thereafter exposed to a stream (52) of drying gas in a drying means (48).

26 Claims, 1 Drawing Sheet

METHOD AND APPARATUS FOR DRYING SEWAGE SLUDGE

The invention relates to a method of drying sewage sludge and an apparatus for carrying out the method.

A known method for drying sewage sludge uses a drum drier into which the sewage sludge is introduced in liquid form. Besides the sludge, hot air is also introduced at a temperature of between 600° C. and 800° C. into the drum drier which rotates about its axis at a low speed of the order of magnitude of one revolution per minute. The hot air causes the liquid component of the sludge to evaporate. The evaporated liquid component is removed from the drum drier so that only the solids component of the sludge, with a given level of residual moisture content, remains behind in the drum drier.

The residual moisture content of the sludge after the drying operation is of the order of magnitude between the 10 and 20% by weight or higher, depending on the temperature of the hot air introduced into the drum drier and the rotation time of the drum drier. If the dried sludge is used for example in agriculture as a fertilizer, it is advantageous for the residual moisture content of the dried sludge to be of the order of magnitude of around 10% by weight. Such a dry sludge can be spread using the conventional fertilizer spreading equipment. If the sludge is to be deposited on a dump, it is advantageous for the residual moisture content thereof to be between 10 and 20% by weight. When composting sewage sludges, higher residual moisture contents, of the order of magnitude of between 50 and 65% by weight, are desired.

A drum drier requires a high level of energy, by virtue of its using hot air. Another disadvantage of such a drum drier is that the feed amount of hot air becomes progressively smaller with an increasing volume of the sewage sludge introduced into the drier so that it is necessary for the amount of sludge introduced to be correctly set.

The object of the present invention is to provide a method of drying sewage sludge and an apparatus for carrying out that method which requires a low level of energy and with which the residual moisture content of the dried sewage sludge can be easily adjusted.

According to the invention, that object is attained in that the liquid sewage sludge is converted into a pasty consistency by predrying, that the pasty sludge is then put into the form of particles with a relatively large surface area, and that the particles are exposed to a stream of drying gas.

By virtue of the fact that the sludge which is converted into a pasty consistency is put into the form of particles with a relatively large surface area, the stream of drying gas can come into contact with the particles over a large area, thus providing a good particle drying action in an advantageous manner with a comparatively low-temperature stream of drying gas. The particles which have a relatively large surface area have a residual moisture content of $\leqq 5\%$ by weight after the drying operation.

The method according to the invention makes it easily possible for the residual moisture content of the sludge which is in the form of particles to be adjusted as desired, while the amount of energy required in the method according to the invention is small in comparison with the known methods of drying sewage sludge.

It has been found advantageous for the predried pasty sludge to be formed into particles resembling small sausages, the length thereof being larger than the diameter thereof by a multiple. Sausage-like particles of that kind are of a diameter of the order of magnitude of about 5 mm and a length of the order of magnitude of 40 mm. The method according to the invention makes it possible to provide for any desired residual moisture content in the dried sewage sludge. The lower the residual moisture content of the dried sludge, the lower are the costs of transporting the dried sewage sludge for example to a dump, to an agricultural site, to a composting installation or the like, because in that case there is only a small amount of liquid ballast that also has to be transported therewith.

The apparatus according to the invention is characterised by a predrying means in which the liquid sewage sludge is converted into a pasty consistency, a shaping means in which the pasty sludge is put into the form of particles, wherein the shaping means includes a conveyor screw, a receiving means arranged beneath the conveyor screw for a given amount of the pasty sludge which is transported by means of the conveyor screw, and a die which is arranged beneath the receiving means and which has perforation holes and a pressing member with which the pasty sludge is pressed through the perforation holes in the die, forming the sausage-like particles, and a drying means for drying the shaped particles to give a given residual moisture content.

The predrying operation can be carried out in a per se known centrifuge, filter press or the like. Such a predrying means requires only a small amount of energy for driving it. The conveyor screw makes it possible for the pasty sewage sludge to be continuously removed from the predrying means. The amount of pasty sewage sludge which is conveyed on by means of the conveyor screw is fixed by the receiving means which is disposed beneath the conveyor screw. The pasty sewage sludge is transferred to the die which has a pressing member, the sausage-like particles being formed from the pasty sewage sludge by means of the pressing member and the perforation holes in the dye.

The receiving means may be in the form of a longitudinal channel or trough which is arranged concentrically with respect to the longitudinal axis of the conveyer screw and which is pivotable about the longitudinal axis of the conveyor screw. In that connection the longitudinal extent of the longitudinal channel or trough corresponds at least to the longitudinal extent of the conveyor screw. The design configuration of the longitudinal channel, being pivotable about the longitudinal axis of the conveyor screw, provides a receiving means which takes up a relatively small amount of space.

The radial distance between the longitudinal axis of the conveyor screw and the longitudinal channel or trough may be adjustable. In that way it is possible to adjust the space between the conveyor screw and the longitudinal channel, and the amount of pasty sewage sludge which can be accommodated in the receiving means. That amount determines the amount of sausage-like particles which can be formed in each particle-shaping operation.

A stripper may be provided in the space between the conveyor screw and the longitudinal channel for stripping the pasty sewage sludge from the longitudinal channel which is pivotable about the longitudinal axis of the conveyor screw. The stripper member prevents the pasty sludge from sticking to the receiving means so that, when the longitudinal channel is pivoted about the longitudinal axis of the conveyor screw, the amount of pasty sludge which is present in the receiving means is transferred to the particle-shaping die.

It has been found to be desirable of the stripper member to be adjustable for the purposes of regulating the amount of pasty sewage sludge which is conveyed by the conveyor screw through the longitudinal channel, in the space between the conveyor screw and the channel. The fact that the stripper member is adjustable for regulating the amount of pasty sewage sludge conveyed through the longitudinal channel by the conveyor screw also makes it possible to adjust the level of the residual moisture content of the dried sewage sludge.

The pressing member in the die is preferably in the form of a flap which is of a surface area corresponding to half the base area of the die, and the flap is pivotable about an axis which bisects the base area of the die and which extends in parallel relationship to the longitudinal axis of the conveyor screw. A pressing member which is in the form of a flap affords the advantage that the flap can already be in the process of being supplied again with the pasty sludge on one side thereof, while the opposite side thereof is pressing pasty sludge through the perforation holes in the die, thereby forming the sausage-like particles. In that way it is possible to form a relatively large amount of shaped and preferably sausage-like particles per unit of time from the pasty sewage sludge.

It has been found to be particularly advantageous for the flap to perform a slower pivotal movement in the vicinity of the die than in the remainder of the range of pivotal movement between the two positions of the flap at which it reverses its direction of movement, as are determined by the die. The slower pivotal movement of the flap in the vicinity of the die produces a suction effect between the die and the flap, the suction effect causing any hairs, threads or like which are to be found in the pasty sludge to be entrained by means of the flap from the perforation holes, thus easily preventing the perforation holes from becoming blocked up by such hairs or threads. The hairs or threads which are sucked away and carried off by the flap are displaced laterally by a small distance in the next following pivotal movement of the flap so that in the next pressing operation they are pressed through the perforation holes in the die. In that way, the operation of shaping the pasty sewage sludge to provide particles of relatively large surface area, in particular sausage-shaped particles, is trouble-free.

A belt conveyor means may be disposed beneath the particle-shaping means, the sausage-like particles falling on to the belt conveyor means, and the belt conveyor means may have perforation holes, the stream of drying gas flowing from the perforation holes through the layer of particles deposited on the belt conveyor means or from the layer through the perforation holes in the belt conveyor means. The belt conveyor means may move in a stepwise or continuous fashion. A suitable choice in respect of the speed of feed movement of the belt conveyor means makes it possible to adjust the height of the layer of particles which are deposited on the belt conveyor means. The height of the layer of particles, the speed of feed movement of the belt conveyor means and the temperature of the stream of drying gas passing through the layer of particles on the belt conveyor means are parameters which determine the residual moisture content of the dried sludge in particle form. It would also be possible to provide for free fall of a defined volume of the sausage-like particles to be dried, and for a stream of drying gas to flow against the particles in a condition of free fall, from below and for example also from the side.

It has been found to be advantageous for the belt conveyor means to be enclosed by a drying oven which forms the drying means and which has a plurality of chambers in the longitudinal direction of the belt conveyor means for guiding the stream of drying gas successively and alternately from the layer of particles through the perforations in the belt conveyor means and from the perforations through the layer of particles. By virtue of the stream of drying gas being alternately guided in that fashion, from the layer of particles through the perforations and conversely from the perforations through the layer of particles, the particles are of a homogeneous and continuously decreasing moisture content. That avoids excessively rapid drying of only the surface layers of the individual particles of sludge. Excessively rapid drying of the surface layers of the particles would result in crust formation thereon, which would give rise to problems in regard to further drying of the particles. The design configuration of the drying oven in accordance with the invention provides that the heat energy of the stream of drying gas is delivered to the particles of sludge for drying thereof in the optimum fashion.

At least one additional conveyor means may be provided in the drying oven beneath the belt conveyor means, in which respect conveyor means which are disposed one beneath the other are driven in opposite directions of feed movement thereof. The sausage-like particles are passed through the drying oven repeatedly by the conveyor means which are disposed one beneath the other so that the heat energy of the stream of drying gas which flows through the drying oven is utilised to an even better degree. In addition, when using an even number of conveyor means, it is possible for the dried sludge to be discharged at the side of the drying oven at which the particle-shaping means is disposed. The additional conveyor means may also be belt conveyor means. If there is only a single additional conveyor means under the belt conveyor means, then the additional conveyor means is preferably in the form of what is known as a scraper conveyor.

An ancillary means may be provided for removing the sausage-like particles from the belt conveyor means and for freeing the perforation holes therein. The ancillary means may be a striker or beater means, a brush or the like. The ancillary means is arranged upstream of the drying oven in relation to the direction of feed movement of the belt conveyor means.

Depending on the use to which the dried sewage sludge is to be put, the residual moisture content thereof, with the method according to the invention, is from 5 to 15% by weight when it is to be used in agriculture as a fertilizer, from 10 to 20% by weight when it is to be stored on a dump or from 50 to 65% by weight when it is to be used for composting purposes.

Further details, features and advantages will be apparent from the following description of an apparatus according to the invention, for carrying out the method according to the invention for drying sewage sludge, as illustrated in diagrammatic form in the drawing in which:

FIG. 1 shows a part of the apparatus according to the invention, from the predrying means for the liquid sewage sludge to the location at which the sludge which has been put into the form of particles is introduced into a drying means, and FIG. 2 is a diagrammatic view of a drying means for drying the particles of sewage sludge which have been put into shape in a shaping means.

FIG. 1 shows a predrying means 10 into which liquid sewage sludge is introduced. The introduction of the liquid sewage sludge into the predrying means 10 is indicated by the arrow 12. The liquid sewage sludge 12 is converted into a pasty consistency in the predrying means 10 which may be a centrifuge, a filter press or the like. The pasty sewage sludge is put into the form of particles of a relatively large surface area, in the direction of the arrow 14, in a shaping means 16. The liquid which is separated from the pasty sludge is removed from the predrying means, as indicated by the arrow 18'.

The shaping means 16 comprises a conveyor screw 18, a receiving means 20 disposed beneath the conveyor screw 18 for receiving a given amount of the pasty sludge 14 which is conveyed by means of the conveyor screw 18, and a die 22 disposed beneath the receiving means 20, with a pressing member 24. The die 22 is of a length which corresponds at least to the length of the receiving means 20. Reference numeral 26 denotes the perforation holes which are provided in the die 22. The pasty sludge is pressed by the pressing member through the perforation holes 26 in the die 22, thereby forming the sausage-like particles.

The receiving means 20 is in the form of a longitudinal channel or trough which is arranged concentrically with respect to the longitudinal axis 28 of the conveyor screw 18 and which is pivotable about the longitudinal axis 28 of the conveyor screw 18. The pivotability of the receiving means 20 in the form of the longitudinal channel or trough is indicated by the arrow 34 in FIG. 1. For the purposes of fixing the amount of pasty sludge accommodated by the receiving means 20, the radial distance between the longitudinal axis 28 of the conveyor screw 18 and the receiving means 20, which is identified by R in FIG. 1, is adjustable. Disposed in the space 32 between the conveyor screw 18 and the receiving means 20 is a stripper member 30 which serves for stripping the pasty sludge from the receiving means which is pivotable in the direction indicated by the arrow 30 about the longitudinal axis 28 of the conveyor screw 18. When the receiving means 20 is pivoted about the longitudinal axis 28 of the conveyor screw 18 in the direction indicated by the arrow 30, a given amount of the pasty sewage sludge 14 drops on to the die 22 or on to the pressing member 24 respectively. For the purposes of regulating the amount of pasty sludge in the receiving means 20, it is also possible for the stripper member 34 to be made adjustable in the direction indicated by the double-headed arrow 36, in the space 32 between the conveyor screw 18 and the receiving means 20.

The pressing member 24 of the die 22 is in the form of a flap having a surface area which corresponds to half the base area of the die 22. The flap-like pressing member 24 is pivotable about an axis 38 which bisects the base surface of the die 22. The arrows 40 which extend towards each other indicate the pivotability of the flap-like pressing member 24. The axis 38 of the flap-like pressing member 24 extends in parallel relationship to the longitudinal axis 28 of the conveyor screw 18.

The sausage-like particles which are formed by means of the die 22 and the pressing member 24 which can be pivoted to and fro in the directions indicated by the arrows 40 drop on to a belt conveyor means 42 which is disposed beneath the particle shaping means 16. Only part of the belt conveyor means 42 is shown in FIG. 1. The belt conveyor means 42 comprises guide rollers 44, only one of which is shown in FIG. 1. It further comprises a conveyor belt 46 with perforation holes therethrough. FIG. 1 also shows a part of a drying means 48 in which the sausage-like particles are exposed to a stream of drying gas.

FIG. 2 is a diagrammatic block diagram of the shaping means 16 as described hereinbefore. The arrow 50 indicates that the sausage-like particles drop on to the belt conveyor means 42, with which they are advanced through the drying means 48 and exposed to a stream 52 of drying gas. The belt conveyor means 42 is enclosed by the drying means 48 in the form of a drying oven 54 which in the longitudinal direction of the belt conveyor means 42 provides a plurality of chambers 56, 58, 60 and 62 in which the stream of drying gas 52 is guided successively and alternately from the layer 64 of sausage-shaped particles through the perforations in the conveyor belt 46, and from the perforations in the conveyor belt 46 through the layer 64 of particles. Reference numeral 44 in FIG. 2 denotes the two mutually parallel guide rollers for the conveyor belt 46 of the belt conveyor means 42. Disposed beneath the belt conveyor means 42 is an additional conveyor means 66 which is driven in the opposite direction of feed movement by means of a crossed transmision 68. The arrows 70 and 72 in FIG. 2 indicate the opposite directions of feed movement of the respective conveyor means. The dried sewage sludge falls into a collecting means 74 over the second guide roller 44 which is shown at the right-hand side in FIG. 2. The second conveyor means 66 is shown in diagrammatic form as a per se known scraper conveyor. For the purposes of removing the sausage-shaped particles from the belt conveyor means 42 and in particular for clearing the perforation holes in the conveyor belt 46 of the belt conveyor means 42, the apparatus has an ancillary means 76 which is moved in the direction indicated by the double-headed arrow 78 and which strikes against the conveyor belt 46 of the belt conveyor means 42. Reference numeral 80 denotes an inlet for the stream 52 of drying gas, through which the stream 52 of drying gas passes at a temperature of the order of magnitude of around 180° C. into the drying oven 54 or into the first chamber 56 thereof. Reference numeral 82 denotes an outlet through which the stream 52 of drying gas leaves the drying oven 54 or the chamber 62 thereof again, at a lower temperature. The last-mentioned temperature is of the order of magnitude of around 80° C. Reference numeral 84 denotes partitioning wall members which guide the stream 52 of drying gas alternately from the layer 64 of particles through the perforations in the conveyor belt 46 and from the perforations in the conveyor belt 46 through the layer 64 of particles respectively. The meander-like path along which the stream 52 of drying gas is guided, through the layer 64 of particles, provides that the particles are homogeneously or uniformly moist and gives a continuously reducing moisture content in the sausage-like particles of sewage sludge which are deposited in a layer of the conveyor belt 46.

What is claimed is:

1. Apparatus for carrying out the drying of sewage sludge comprising:
   predrying means in which the liquid sewage sludge is converted into a pasty consistency;
   shaping means in which the pasty sludge is put into the form of elongated particles, conveyor screw means, receiving means, said conveyor screw means supplying said sewage sludge from said predrying means and said receiving means, die means arranged beneath said receiving means, said receiving means being in the form of a longitudinal channel which is concentric with respect to the longitudinal axis of said conveyor screw means and pivotable about said longitudinal axis of said conveyor screw means, a stripper member located between said conveyor screw means and said receiving means for stripping said pasty sewage sludge from said receiving means, said die having perforation holes therein, a pressing member being capable of pressing the pasty sludge through said die, and forming elongated particles;
   and drying means for drying said elongated particles to a predetermined residual moisture content.

2. Apparatus as set forth in claim 1 wherein said longitudinal axis of the conveyor screw means and the receiving means are separated by a radial distance, and including adjusting means for adjusting said radial distance.

3. Apparatus as set forth in claim 2 wherein said stripper member is pivotable about the longitudinal axis of the conveyor screw.

4. Apparatus as set forth in claim 1 including belt conveyor means disposed beneath said die means on to which the elongated particles fall said belt conveyor means including perforation holes, and drying gas flow means for flowing a stream of drying gas through said perforation holes and said layer of elongated particles which are laid on the belt conveyor means.

5. Apparatus as set forth in claim 4 wherein said drying means includes drying oven means having a plurality of chambers disposed in the longitudinal direction of the belt conveyor means and wherein said drying gas flow means includes means for successively and alternately passing said stream of drying gas from the layer of elongated particles through the perforations in the belt conveyor means and from the perforations through the layer of elongated particles.

6. Apparatus as set forth in claim 4 including at least one additional conveyor means disposed beneath said belt conveyor means and being driven in the opposite direction of feed movement.

7. Apparatus as set forth in claim 4 including an ancillary means for moving said elongated particles from said belt conveyor means and for freeing the perforation holes therein.

8. Apparatus as set forth in claim 5 characterized in that at least one additional conveyor means is provided in the drying oven beneath the belt conveyor means, conveyor means which are disposed beneath the other being driven in opposite directions of feed movement.

9. Apparatus as set forth in claim 5 characterized in that an ancillary means is provided for removing the dried particles from the belt conveyor means and freeing the perforation holes therein.

10. Apparatus as set forth in claim 6 characterized in that an ancillary means is provided for removing the dried particles from the belt conveyor means and freeing the perforation holes therein.

11. Apparatus for carrying out the drying of liquid sewage sludge comprising predrying means for converting said liquid sewage sludge into a partially dried sewage sludge, shaping means for forming said partially dried sewage sludge into elongated particles, metering means for metering a predetermined amount of said partially dried sewage sludge into said shaping means whereby said elongated particles have a predetermined length determined by said predetermined amount of said partially dried sewage sludge metered into said shaping means, and drying means for drying said elongated particles to a predetermined residual moisture content, said shaping means including die means including a plurality of apertures extending therethrough and pressing means for pressing said partially dried sewage sludge through said plurality of apertures in said die means so as to form said elongated particles therefrom, and said metering means including receiving means for carrying said predetermined amount of said partially dried sewage sludge and intermittently supplying said predetermined amount of said partially dried sewage sludge to said shaping means, and conveyance means for continuously supplying said partially dried sewage sludge to said receiving means.

12. The apparatus of claim 11 wherein said conveyance means comprises screw conveyor means having a longitudinally extending axis.

13. The apparatus of claim 12 wherein said receiving means comprises longitudinally extending channel means concentrically disposed about said longitudinal axis of said screw conveyor means and separated a predetermined distance therefrom, said longitudinally extending channel means being pivotable about said longitudinal axis of said screw conveyor means, whereby said predetermined amount of said partially dried sewage sludge can be intermittently supplied to said shaping means by pivoting said longitudinally extending channel means about said longitudinally extending axis of said screw conveyor means.

14. The apparatus of claim 13 including stripper means disposed between said screw conveyor means and said longitudinally extending channel means at a predetermined location along said longitudinally extending channel means for stripping said partially dried sewage sludge from said longitudinally extending channel means upon said pivoting of said longitudinally extending channel means.

15. The apparatus of claim 13 including adjusting means for adjusting said predetermined distance between said longitudinally extending channel means and said screw conveyor means.

16. The apparatus of claim 14 including stripper adjustment means for adjusting said predetermined location of said stripper means along said longitudinally extending channel means whereby said predetermined amount of said partially dried sewage sludge intermittently supplied to said shaping means may be determined thereby.

17. The apparatus of claim 11 wherein said die means has a predetermined area, and wherein said pressing means comprises flap means having a surface area corresponding to no more than about one-half of said predetermined area of said die means, said flap means being displaceable so as to alternately correspond to first and second portions of said predetermined area of said die means so as to alternately press said partially dried sewage sludge through said die means at said first and second portions thereof, respectively.

18. The apparatus of claim 17 wherein said flap means includes a first surface and a second surface, and wherein said pressing means further includes pivot means for pivoting said flap means with respect to said die means whereby said first and second surfaces of said die means alternately contact said first and second portions of said predetermined area of said die means.

19. The apparatus of claim 18 wherein said conveyance means comprises screw conveyor means having a longitudinally extending axis, and said receiving means comprises longitudinally extending channel means concentrically disposed about said longitudinally extending axis of said screw conveyor means and separated a predetermined distance therefrom, said longitudinally extending channel means being pivotable about said longitudinally extending axis of said screw conveyor means, whereby said predetermined amount of said partially dried sewage sludge can be intermittently supplied to said shaping means by pivoting said longitudinally extending channel means about said longitudinally extending axis of said screw conveyor means.

20. The apparatus of claim 19 wherein said pivot means includes means for pivoting said flap means about a longitudinally extending pivot axis, said longitudinally extending pivot axis being substantially parallel to said longitudinal axis of said screw conveyor means.

21. The apparatus of claim 20 wherein said pivot means includes means for slowing said pivotal movement of said flap means as said flap means approaches said first and second portions of said predetermined area of said die means.

22. The apparatus of claim 11 wherein said drying means includes belt conveyor means for receiving said elongated particles from said shaping means, said belt conveyor means including a plurality of perforations therethrough, and drying gas flow means for flowing a drying gas through said perforaton means in said belt conveyor means with said elongated particles thereon.

23. The apparatus of claim 22 wherein said drying means includes drying oven means surrounding at least a portion of said belt conveyor means.

24. The apparatus of claim 23 wherein said drying oven means comprises a plurality of drying chambers disposed along said portion of said conveyor belt means, and wherein said drying gas flow means includes means for alternating the flow of said drying gas through said conveyor belt means in alternate directions in each of said plurality of drying chambers.

25. The apparatus of claim 24 including auxiliary belt conveyor means disposed beneath said belt conveyor means, and including driving means for driving said belt conveyor means and said auxiliary belt conveyor means in opposite directions.

26. The apparatus of claim 25 including removal means for removing partially dried sewage sludge residue from the surface of said belt conveyor means.

* * * * *

UNITED STATES PATENT AND TRADEMARK OFFICE
CERTIFICATE OF CORRECTION

PATENT NO. : 4,768,292

DATED : September 6, 1988

INVENTOR(S) : Jürgen Manzei

It is certified that error appears in the above-identified patent and that said Letters Patent is hereby corrected as shown below:

In the Abstract, line 3, "pastry" should read --pasty--.
In the Abstract, line 4, "pastry" should read --pasty--.

Column 1, line 19, following "magnitude" insert --of--.
Column 2, line 64, following "stripper" insert --member--.
Column 5, line 39, "34" should read --30--.
Column 5, line 46, "30" should read --34--.

Signed and Sealed this

Twenty-first Day of March, 1989

Attest:

DONALD J. QUIGG

*Attesting Officer*   *Commissioner of Patents and Trademarks*